July 20, 1926. Re. 16,392
H. H. WILHELM
GRAPE PACKING SYSTEM
Original Filed Oct. 7, 1922 2 Sheets-Sheet 1
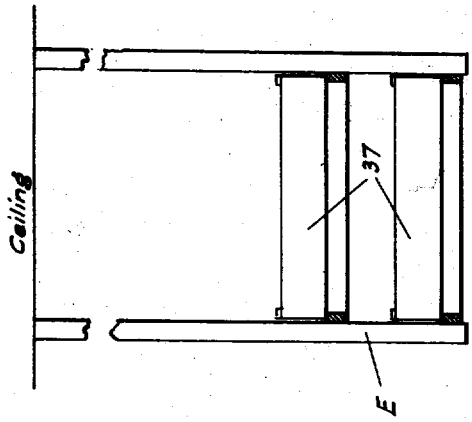
Fig. 1
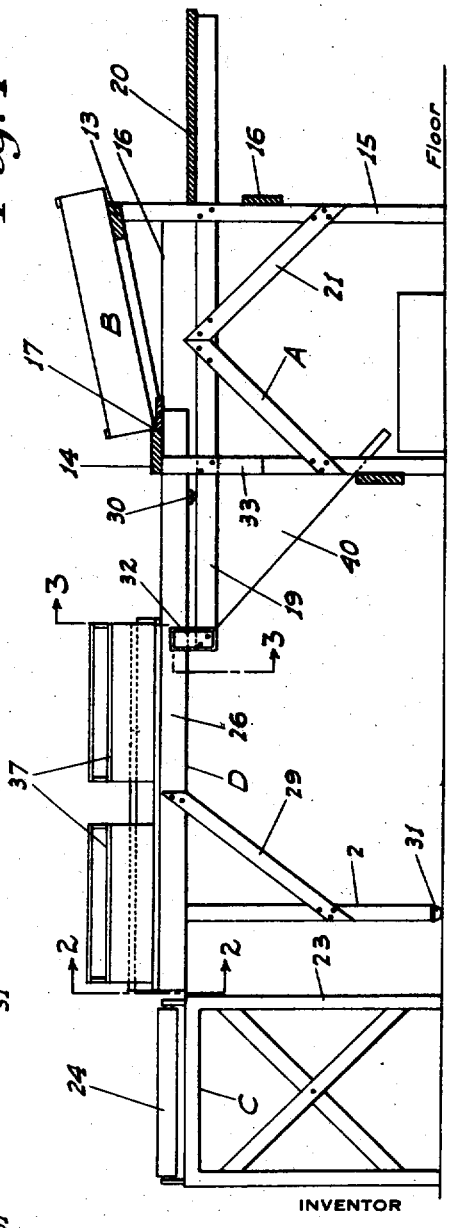
Fig. 3
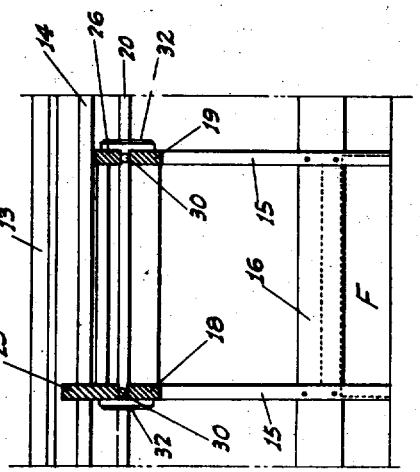
Fig. 2
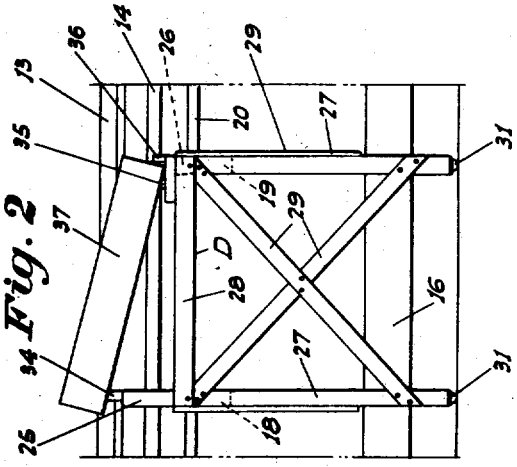
INVENTOR
Herman H. Wilhelm
BY
ATTORNEY July 20, 1926.

Re. 16,392

H. H. WILHELM

GRAPE PACKING SYSTEM

Original Filed Oct. 7, 1922 2 Sheets-Sheet 2

INVENTOR

*Herman H. Wilhelm*

BY Percy J. Wilhelm

ATTORNEY

Reissued July 20, 1926. Re. 16,392

UNITED STATES PATENT OFFICE.

HERMAN H. WILHELM, OF DINUBA, CALIFORNIA, ASSIGNOR TO KUHN SERVICE MACHINE COMPANY, OF STOCKTON, CALIFORNIA, A CORPORATION.

GRAPE-PACKING SYSTEM.

Original No. 1,495,384, dated May 27, 1924. Serial No. 538,160, filed October 7, 1922. Application for reissue filed May 18, 1926. Serial No. 110,023.

This invention relates to packing systems of that type in which work tables are employed for the sorting and packing of grapes or any other fruit or articles and the lugs or receptacles removed after they have been packed. Under present day and modern requirements prescribed by laws governing the operations of labor in various States it is required to provide facilities for handling containers of fruit and other products so that lifting of more than a certain weight by hand is avoided from the time the containers are placed upon the work table until the contents have been sorted, packed, inspected and the finished product finally removed and especially are these requirements enforced where female help is employed in large packing houses.

The primary object of this invention is to provide a work table that will comply with these requirements in a thoroughly efficient and effective manner whereby the packing operation is facilitated. Among further objects is to provide improved means of the character mentioned which enables the operator or operators to work with the greatest possible speed and convenience.

Although this invention is particularly adapted for sorting, packing and inspecting grapes, it is to be understood that it is not restricted to such use, but is equally applicable to tables for any other purposes which involves similar movements on the part of the operator.

This invention is adapted to be constructed as a series of adjacent similar table units, connected together or separate as may be desired, each units forming a complete work table for one operator.

The following description will be confined specifically to the construction of one table unit, it being understood that any desired number of such units may be used, all having a common supply rack or receiving element and a common discharge conveyor or delivery element, as will be later set forth.

In the accompanying drawings forming part of this specification,

Fig. 1 is a side view of my invention, the field box or receptacle receiving element at the right being shown partly in cross section.

Fig. 2 is an end view of one of the transversely arranged work tables, the line 2—2 indicating the position in Fig. 1 from which the view is taken.

Fig. 3 is a section of Fig. 1 taken on the line 3—3.

Figure 4:
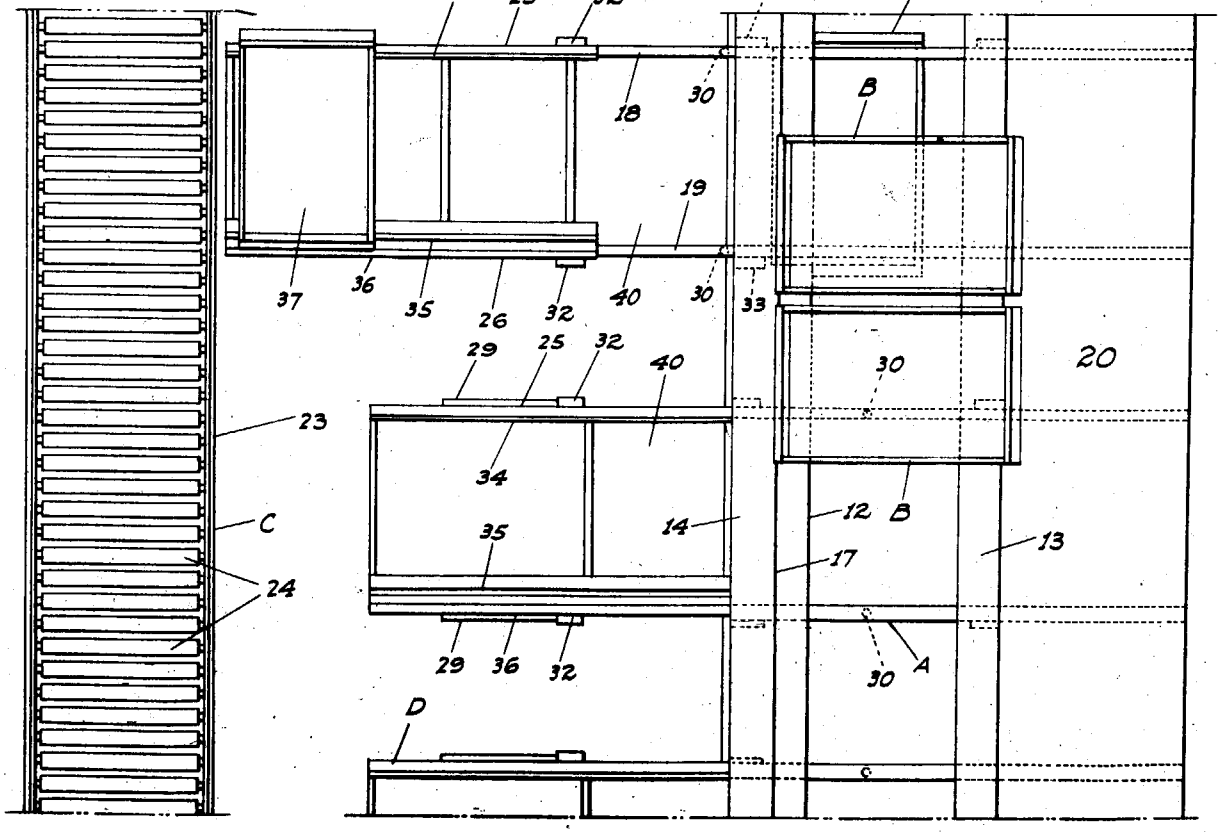
Fig. 4 is a plan view of my invention, one of the transversely arranged work tables being shown in extended position for assisting the operator in transferring the lugs or receptacles thereon to the lug or receptacle delivery element at the left.

In the drawings, A indicates the receiving element for a series of containers B, said receiving element being in the form of a skeleton frame of any desired construction upon which are mounted longitudinal members 12, 13 and 14, which are supported by the legs 15 and the transverse and longitudinal members 16. The longitudinal members 12 and 13 are arranged so as to support a longitudinal series of the receptacles or boxes filled with grapes or other fruit or produce fresh from the field to be packed, graded and sorted. These receptacles are placed with their bottoms slanting downwardly against a stop shoulder 17 at the lower ends toward the work side of the receiving element.

At spaced intervals projecting on the work side of the receiving element are horizontal and laterally disposed pairs of parallel track rails 18 and 19, each pair of said rails extending across and secured to the frame and projecting at the rear side of the receiving element to form a support upon which a platform 20 is mounted for supporting a supply of the field boxes previous to being set in slanting and working position upon the supports 12 and 13. The frame of the receiving element is also reinforced by braces 21.

A delivery element C is arranged parallel to the receiving element at a distance from the outer ends of the track rails 18 and 19 on the work side of the receiving element and consists as shown of a roller conveyor composed of a suitable frame 23 upon which are journaled a series of antifriction rollers 24 to assist in delivering the lugs or crates containing the grapes or other product after packing, sorting and inspecting.

Arranged to travel laterally towards and away from the delivery element C, on the pairs of tracks 18 and 19, are work tables D. Each table consists of a pair of slides 25 and 26, supported at their outer ends by the legs 27 and secured by cross pieces and braces 28 and 29. These slides are parallel over the tracks 18 and 19 and bear thereon by the anti-friction ball casters 30 to reduce friction. The lower ends of the legs 27 also bear upon the floor by the ball casters 31 so that the entire table may be moved freely in and out upon the track rails 18 and 19. Suitable guides 32 and 33 serve to hold the slides in place upon the track rails 18 and 19 during said movement. The slide 25 is higher than the slide 26, on its outer portion, whereby the lugs or receptacles to be packed with grapes or other produce may be supported in downwardly slanting position thereon towards the packer standing adjacent to the work side of the table. The receptacle supporting portions of the slides 25 and 26 are provided with wear strips 34 and 35 upon which the receptacles rest and the lower slide is also provided upon its upper portion with a stop strip 36, against which the lower corners of the receptacles rest to prevent the receptacles from sliding away. The length of the receptacle supporting portion of the work table is sufficient to hold two receptacles 37 to be packed with grapes or produce but the length and size may be varied to suit any requirements. The distance between the outer ends of the work tables D when in receded position and the delivery element C and the distance between adjoining work tables are sufficient to provide free movement of packers and inspectors during the packing and inspection of fruit or other produce and materials. The height of the receiving element A, work tables D and delivery element C is calculated so that a minimum of lifting effort is necessary by the operator during the packing of the fruit and delivery of the receptacles filled with the fruit or other produce. Empty receptacles or lugs 37 are supplied from an overhead rack E supported from the ceiling within easy reach of the packer.

In operation field boxes or receptacles B loaded with grapes or other produce to be graded, sorted and packed are placed upon the receiving element A as shown. The packer stands facing the work side of the work table D when the latter is in receded position. The grapes or other produce are then lifted according to quality from the field boxes and placed in the lugs or receptacles 37, the two receptacles 37 permitting first and second quality to be packed separately. When the receptacles 37 are filled or partly filled the work table D is slid into outermost position as shown in Figs. 1 and 4 and the culls picked from the bunches or other produce in the receptacles or remaining in the field boxes dumped or dropped into a chute 40, which is provided below and between the track bars 18 and 19 from whence they slide into a container F, placed in the lower portion of the receiving element for that purpose. The filled lugs or receptacles loaded with assorted and graded grapes or produce are readily shifted with substantially no lifting effort from the work table onto the delivery element C and the table moved into receded position in readiness to repeat the operation. From time to time an inspector can readily pass down the aisle between the delivery element and the outer ends of the receded work tables and inspect the produce and quality of work being performed.

In accordance with the patent statutes, I have described the principles of operation of my invention, together with the apparatus which I now consider to represent the best embodiment, but I desire to have it understood that the construction shown is only illustrative and that the invention can be carried out by other means and applied to uses other than those above set forth within the scope of the following claims.

Having thus described my invention, what I claim as new and useful and desire to secure by Letters Patent is:

1. In a packing system, a longitudinal receiving element for supporting receptacles, and a plurality of work tables to support receptacles mounted for free transverse movement to and from one side of said receiving element whereby to facilitate movement of the receptacles supported by the tables relative to the receiving element.

2. In a packing system, a longitudinal receiving bench for supporting receptacles, a plurality of guide units extending laterally from one side thereof, receptacle-supporting work tables movable laterally of the bench and guided by said units, and anti-friction supports on the outer ends of the table to bear on a supporting surface below the guide units.

3. In a packing system, a longitudinal receiving bench for supporting receptacles, a plurality of pairs of guide rails extending laterally from one side of the bench, receptacle-supporting work tables movable laterally of the bench and guided by said rails, and a chute below and between each pair of rails to receive culls or refuse.

4. In a fruit packing system the combination with a receiving element and a delivery element arranged in spaced relation, of a packing work table having its support normally fixed adjacent the receiving element, whereby fruit received on the latter may be removed and packed into containers on the work table, the work table being slidably mounted on its support whereby it may be extended to a point immediately adjacent the delivery element so that the containers may be shifted directly from the table to the delivery element.

5. In a fruit packing system the combination with a fixed delivery element, of a packing work table having a fixed support mounted in spaced relation from the receiving element, the table being slidable on its support whereby it may be extended across the space between the support and receiving element to a point immediately adjacent the latter to allow containers on the table to be shifted directly from the table to the delivery element.

6. In a fruit packing system the combination with a receiving element and a delivery element fixed in spaced relation and a work table mounted for reciprocatory movement between the elements whereby fruit from one element may be packed into containers on the table when such table is adjacent that element and the table can be moved across to the other element to allow the containers to be shifted directly from the table to the latter element, and fixed means for supporting and guiding the movement of the table.

7. In a packing system, a receiving element for supporting a receptacle, and a work table for supporting another receptacle mounted to one side of the receiving element for lateral movement to and from the same.

8. In a packing system, a receiving element for supporting a receptacle, a work table for supporting another receptacle mounted to one side of the receiving element for lateral movement to and from the same, and a delivery element disposed in spaced relation to the receiving element and substantially in horizontal alinement with said work table; the work table being disposed between said elements and being movable to a point adjacent the delivery element.

9. In a packing system, a fixed receiving element for supporting a receptacle, a fixed delivery element mounted in spaced relation to the receiving element, and a work table, to support another receptacle, mounted in fixed longitudinal relation with said elements but movable transversely thereof and therebetween.

10. In a packing system, a fixed longitudinal receiving element for supporting receptacles, a fixed longitudinal delivery element disposed in spaced and parallel relation to the receiving element, a plurality of work tables independently movable laterally between the elements, and laterally extending guide members for the tables fixed in longitudinally spaced relation relative to said elements to maintain the tables in such spaced relation and guide the tables in their movement between the elements.

11. In a packing system, a fixed receiving element for supporting a receptacle, a fixed delivery element mounted in spaced relation to the receiving element, a work table to support another receptacle movable between the elements, and guide members for said table mounted in fixed and transverse relation with one of said elements to maintain the table in a definite location longitudinally of the elements and to guide the table in its movement between the elements.

12. In a packing system, a fixed receiving element for supporting a receptacle, a fixed delivery element mounted in spaced relation to the receiving element, a work table to support another receptacle movable between the elements, and guide members for the table extending transversely from the receiving element toward but terminating short of the delivery element a distance less than the length of the table, whereby to permit of the table being moved to a point adjacent the delivery element while being still engaged with the guide members.

In witness whereof I affix my signature.

HERMAN H. WILHELM.